US012575556B2

(12) United States Patent (10) Patent No.: US 12,575,556 B2
Wiesener (45) Date of Patent: Mar. 17, 2026

(54) DEVICE FOR PROTECTING AGAINST BIRDS, AND ARRANGEMENT

(71) Applicant: GSG UrbanGuard GmbH, Mühlenbeck (DE)

(72) Inventor: Mark Wiesener, Mühlenbeck (DE)

(73) Assignee: GSG UrbanGuard GmbH, Mühlenbeck (DE)

( * ) Notice: Subject to any disclaimer, the term of this patent is extended or adjusted under 35 U.S.C. 154(b) by 213 days.

(21) Appl. No.: 18/568,362

(22) PCT Filed: Jun. 9, 2022

(86) PCT No.: PCT/DE2022/000063
§ 371 (c)(1),
(2) Date: Dec. 8, 2023

(87) PCT Pub. No.: WO2022/268243
PCT Pub. Date: Dec. 29, 2022

(65) Prior Publication Data
US 2024/0268369 A1 Aug. 15, 2024

(30) Foreign Application Priority Data
Jun. 25, 2021 (DE) .......................... 202021002182.5

(51) Int. Cl.
*A01M 29/32* (2011.01)
(52) U.S. Cl.
CPC .................................. *A01M 29/32* (2013.01)

(58) Field of Classification Search
CPC .............................. A01M 29/30; A01M 29/32
See application file for complete search history.

(56) References Cited

U.S. PATENT DOCUMENTS

| | | | | |
|---|---|---|---|---|
| 5,649,394 A | * | 7/1997 | Ohba | A01M 29/26 |
| | | | | 116/22 A |
| 5,666,767 A | * | 9/1997 | Ohba | A01M 29/26 |
| | | | | 116/22 A |
| 5,918,404 A | * | 7/1999 | Ohba | A01M 29/26 |
| | | | | 116/22 A |

FOREIGN PATENT DOCUMENTS

| | | | | |
|---|---|---|---|---|
| DE | 102012024377 A1 | | 6/2014 | |
| DE | 202017005880 U1 | | 11/2017 | |
| DE | 102022004178 A1 | * | 11/2022 | A01M 29/32 |

* cited by examiner

*Primary Examiner* — Beth A Stephan
(74) *Attorney, Agent, or Firm* — Laine IP Oy

(57) ABSTRACT

A device for protecting against birds is provided, which has at least one fastening support on which holders are provided, which holders protrude from the fastening support and through each of which holders a protection element, comprising a head part, can be guided; the holders are formed by guide sleeves, which are held on the fastening support in parallel and at a distance from one another; each guide sleeve comprises a guide channel having an entry opening and an exit opening; and each guide channel has a narrowing of the cross section of the guide channel between the entry opening and the exit opening.

18 Claims, 2 Drawing Sheets

DEVICE FOR PROTECTING AGAINST BIRDS, AND ARRANGEMENT

TECHNICAL FIELD

The present invention relates to a device for protecting against birds.

The invention further relates to an arrangement, which comprises one object and at least one device for protection against birds.

BACKGROUND OF THE INVENTION

It has become common practice to provide solar modules, specifically on sloped roofs, for power generation and/or water heating. Modules of this kind are conventionally elevated above the roof surface using corresponding framed panels. A throughgoing, open interspace is thereby formed between the solar modules and the roof surface at a conventional height of 10-16 cm, in some cases at a height of more than 20 cm.

This open space, which is somewhat protected from the elements, is often used by feral street pigeons as a place to sleep or nest, so the utility of the building is negatively affected by droppings and vermin in addition to the noise level.

It is known to use sheet-like structures made of metal or plastic (or netting) in order to block access to the regions underneath the solar modules. In order to improve both ventilation and aesthetics, it is further known to vertically attach metal strips on the borders of the solar modules, which strips are provided with vertically oriented, spot-welded metal wires of varying length, according to the respective distances between the lower edge of a solar module and the roof surface.

Given that the immediate roof surface is often covered with roof tiles which, depending on the structural design, can have a wave-like design in addition to being arranged in an overlapping manner, thus resulting in distances of varying height between the roof surface and the respective lower edge of a solar module, a need exists to vertically adjust the protection elements in a flexible manner in order to obstruct the regions beneath the solar module against the entry of birds, in particular the entry of pigeons.

DE 10 2012 024 377 A1 describes a device for protection against birds, preferably pigeons, by means of which pigeons in particular are prevented from occupying or nesting in the interspace between the solar or photovoltaic modules and the roof surface. This known device is equipped with at least one support, which can be attached to a solar or photovoltaic module and on which holders are provided, through which the protection elements can be inserted and secured to the support in order to prevent birds from entering the interspace between the solar or photovoltaic modules.

After attachment of the fastening support to the solar panel enclosure, protection elements in the form of metal bracket pairs made of wire can be individually moved downwards as far as the roof surface by a user, thus resulting in an adapted barrier between the roof surface and the solar module. In this development, the fastening support represents the "zero line" for the metal bracket pairs. Lengths of wire which are not moved downwards to form a barrier remain above the fastening support and, therefore, above the solar module. Given that the fastening supports represent the only stabilisation or support for the metal bracket pairs, the following is also true:

The greater the distance between the roof surface and the fastening supports, the more elastic or pliable the wire ends of the metal bracket pairs are. Therefore, birds are able to bend or deform the wire ends of the metal bracket pairs and pass through the barrier formed by the metal bracket pairs.

The object of the present invention is to provide a device for protection against birds according to the preamble of claim 1, whereby a potential deformation of protection elements can be prevented or at least hindered, thus resulting in an obstacle that is insurmountable by birds.

SUMMARY OF THE INVENTION

The present invention is defined by the features in the independent claims. Preferential embodiments of the present invention are set out in the dependent claims.

Provided according to a first aspect of the present invention is a device for protecting against birds, which has at least one fastening support on which holders are provided, which holders protrude from the fastening support and through each of which holders a protection element, comprising a head part, can be guided; the holders are formed by guide sleeves, which are held on the fastening support in parallel and at a distance from one another, each guide sleeve comprises a guide channel having an entry opening and an exit opening; and each guide channel has a narrowing of the cross section of the guide channel between the entry opening and the exit opening, each protection element can be moved, in a free falling manner, in the associated guide sleeve from the entry opening thereof at most to the narrowing of the cross section thereof until the fall of the protection element is stopped by the head part thereof resting against the narrowing of the cross section, and adjacent guide sleeves, which are held in parallel with one another on the fastening support, are interconnected by at least one stabilizing connection piece that is spaced apart from the fastening support.

Specific embodiments of said first aspect comprise at least one feature from the following list:

The at least one stabilizing connection piece is located at the height of the ends of the guide sleeves facing away from the fastening support.

The at least one stabilizing connection piece is oriented parallel to the support.

A plurality of stabilizing connection pieces form a throughgoing stabilizing strip.

The protection elements are pin-shaped elements, each comprising a head part.

The pin-shaped elements are in each case made of metal or plastic.

The protection elements are wires, each comprising a wire head.

The wires are made of metal.

The guide sleeves are oriented perpendicular to the fastening support.

The portions of the protection elements inserted into the guide sleeves and protruding from the respective exit openings of the guide sleeves form a stabilizing protection region preventing lateral elasticity.

The stabilizing protection region is oriented perpendicular to the fastening support.

The length of the stabilizing protection region that prevents lateral elasticity is, in the direction of motion of the protection elements, determined by:

the lengthwise portion of the guide sleeves protruding over the fastening supports from the lower edge of the guide sleeve to the narrowing of the cross section of the respective guide channel in addition to:

the length of each protection element affixed to the narrowing of the cross section of the respective guide channel and protruding therefrom.

The entry openings of the guide sleeves can in each case be closed by a plug, or all of them closed by a plug strip, by means of which the securing elements inserted into the guide sleeves are in each case prevented from falling out of the insertion openings of the guide sleeves.

Predetermined breaking points are provided between the guide sleeves, which are arranged on the fastening supports in parallel and at a distance from one another.

The predetermined breaking points are provided parallel to one another.

The guide sleeves are made of UV-stabilized plastic.

The device comprises two or more parallel guide sleeves.

The length of a guide sleeve is in the range between 5 cm and 15 cm.

The length of a protection element is in the range between 5 cm and 15 cm.

An overall obstacle height is obtained by adding the length of the guide sleeve and the length of the protection element.

The parallel guide sleeves are arranged at a distance from 20 mm to 50 mm, e.g. 25 mm, from one another.

Provided according to a second aspect of the invention is an arrangement, which comprises an object and at least one device for protection against birds according to one of claims 1-16.

According to specific embodiments of the second aspect, the object is a photovoltaic module or a solar module.

Significant advantages are provided by the embodiments of the present invention. The device according to the invention for protection against birds independently conforms to a roof contour, e.g. overlapping roof tiles, for reason of the freely falling protection elements within the guide sleeves. No manual adjustment of the individual protection elements by a user is necessary during installation of the device. Furthermore, by providing guide sleeves, a free length of the protection elements between the roof surface and the respective ends of the guide sleeves is relatively short. Due to the relatively short free length of the protection elements, any bending or deformation of the protection elements by a bird is prevented, or at least hindered. Therefore, the device according to the invention represents an insurmountable obstacle to a bird, so the interspace (which is protected from the elements) between the object and the roof surface cannot be used as a place for birds to sleep or nest. A negative effect on the utility of the building can therefore be prevented.

Additional advantages arise from the ability to use multiple devices according to the invention for the protection of an object. For example, a single device can comprise a total of two or more parallel parallel guide sleeves. By means of a contiguous array of a plurality devices according to the invention, an elevated solar module on a roof can, e.g., be circumferentially protected against the entry of birds into the interspace between the roof and the solar module. The circumferential attachment of devices to the solar module can be aided by the devices comprising predetermined breaking points, which are provided between the parallel guide sleeves arranged at a distance from one another.

EMBODIMENTS OF THE INVENTION

Figure 1:
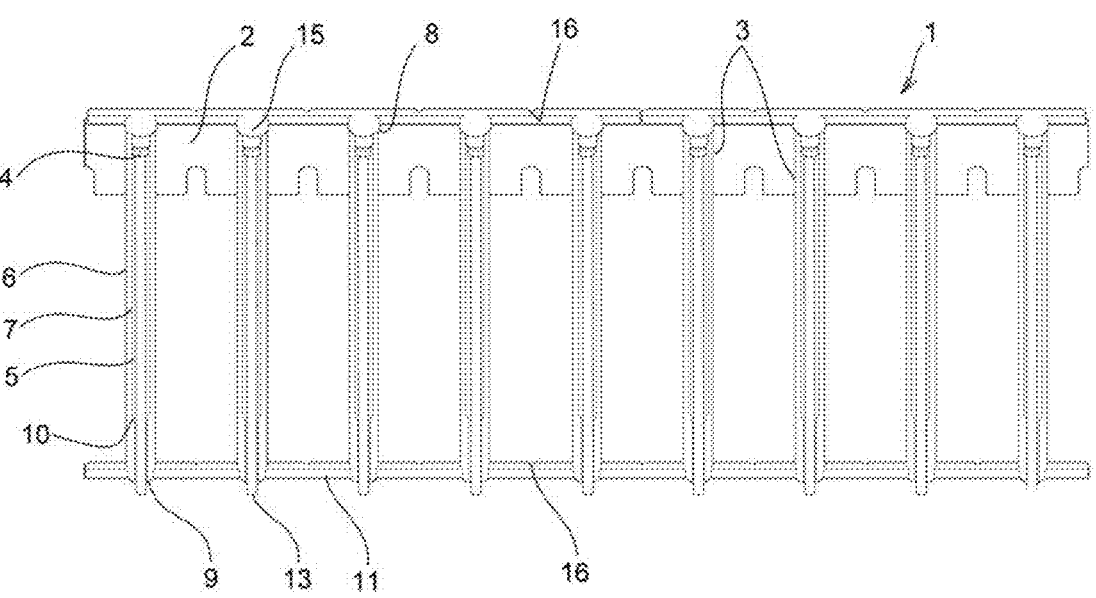
FIG. 1 shows a schematic view of a device for protecting against birds according to at least some embodiments of the present invention.

FIG. 1 shows a schematic view of a device 1 for protecting against birds according to at least some embodiments of the present invention. The device 1 for protection against birds can be attached to an object, e.g., a solar module elevated above a roof of a building. Specific embodiments of the present invention are in particular suitable for protection against pigeons.

The device 1 comprises at least one fastening support 2 on which holders 3 are provided, which holders protrude from the fastening support 2. A protection element 5, which in each case comprises a head part 4, can be guided through each holder 3. According to the present invention, the holders 3 are formed by guide sleeves 6, which are held on the fastening support 2 in parallel and at a distance from one another. The guide sleeves 6 are oriented perpendicular, or essentially perpendicular, to the fastening support 2. Each guide sleeve 6 comprises a guide channel 7 having an entry opening 8 and an exit opening 9. In addition, each guide channel 7 has a narrowing of the cross section 10 of the guide channel 7 between the entry opening 8 and the exit opening 9. The guide sleeves 6 can, e.g., be made of UV-stabilized plastic. The entry openings 8 of the guide sleeves 6 can in each case be closable by a plug 15, or all of them can be closable by a plug strip. The respective protection elements 5 inserted into the guide sleeves 6 are thereby prevented from falling out of the insertion openings 8 of the guide sleeves 6.

Each protection element 5 can be moved, in a free falling manner, in the associated guide sleeve 6 from the entry opening 8 thereof at most to the narrowing of the cross section 10 thereof until the fall of the protection element 5 is stopped by the head part 4 resting against the narrowing of the cross section 10. Alternatively, the free fall of a protection element 5 in the guide channel 7 of the guide sleeve 6 can be stopped by the oppositely arranged end 13 of the head part 4 resting against the roof surface.

The protection elements 5 can in each case be, e.g., pin-shaped elements comprising a head part. The pin-shaped elements can in each case be made of metal or plastic. Alternatively, the protection elements 5 can in each case be wires comprising wire heads. Protection elements 5 formed from wire are conventionally made of metal. In FIG. 1, the protection elements 5 are shown before the free fall along the guide channels 7.

The guide sleeves 6, which are held in parallel with one another on the fastening support 2 and are in each case adjacent one another, are further connected to one another by at least one stabilizing connection piece 11. The at least one stabilizing connection piece 11 is arranged at a distance from the fastening support 2. Conventionally, the at least one stabilizing connection piece 11 is located at the height of the end of the guide sleeves 6 facing away from the fastening support 2 in order to provide the most stable device possible. In addition, the at least one stabilizing connection piece 11 is conventionally oriented parallel to the support. The guide sleeves 6 can be attached to an individual throughgoing stabilizing connection piece 11 or, alternatively, a stabilizing connection piece 11 can in each case be provided between two adjacent guide sleeves 6 so that a plurality of stabilizing connection pieces 11 form a throughgoing stabilizing strip.

Predetermined breaking points 16, which are arranged in parallel to one another, can be provided between the guide sleeves 6, which are arranged in parallel and at a distance from one another on the fastening support 2. In such a case, the stabilizing connection piece 11, or rather the through-going stabilizing strip, is correspondingly prefabricated from a plurality of stabilizing connection pieces 11 having predetermined breaking points 16 between the respective guide sleeves 6. As a result, the device can easily be divided into smaller units.

Figure 2:
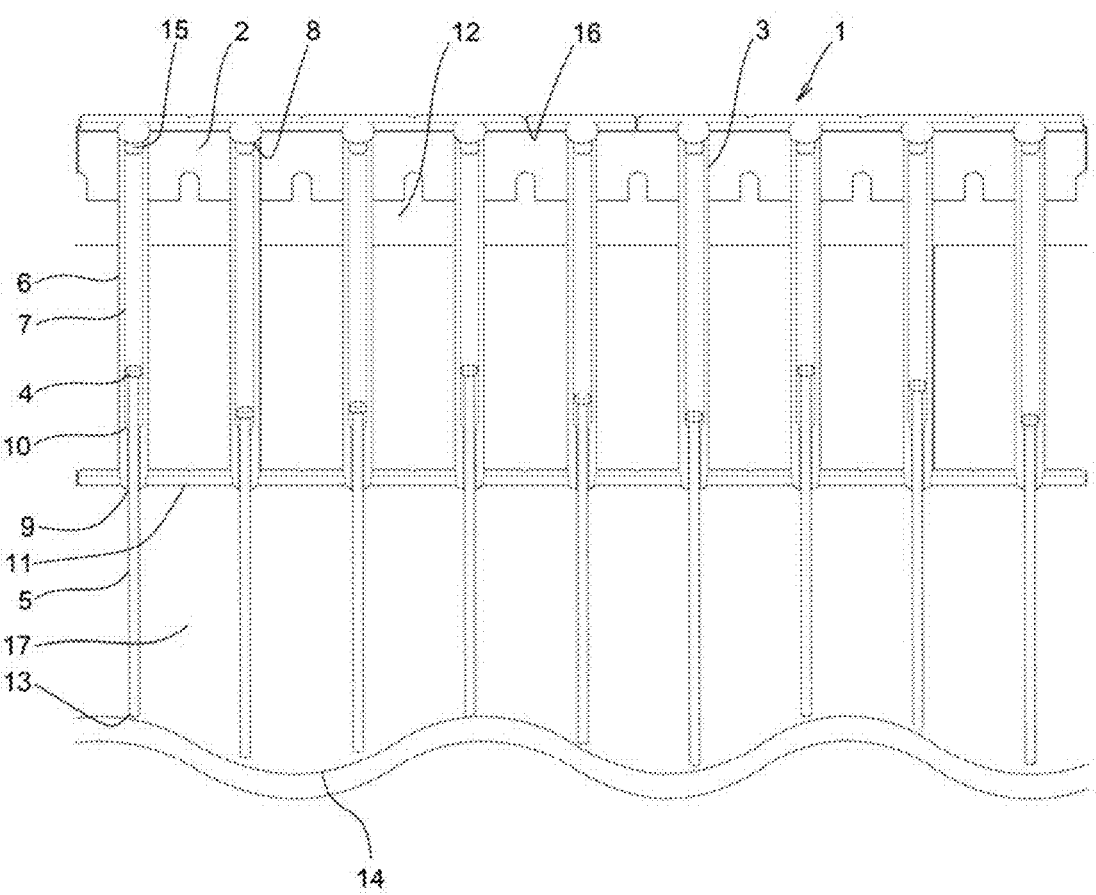
FIG. 2 shows a schematic view of an arrangement for protecting against birds according to at least some embodiments of the present invention.

FIG. 2 is a schematic view of an arrangement for protection against birds according to at least some embodiments of the present invention. The device shown in FIG. 1 is attached to an object 12. The object 12 is, e.g., a solar module elevated above a roof surface 14. The roof surface 14 shown is not entirely flat.

When the fastening support 2 is installed on the object 12, the protection elements 5 provided within the guide sleeves free fall into their protective positions. Each protection element of the device 1 independently conforms to the roof contour. The free fall of some of the protection elements 5 is stopped by the corresponding head part 4 resting against the narrowing of the cross section 10 of the guide channel 7. The free fall of the other protection elements is stopped by the end of the protection element 13 resting against the roof surface 14. No manual adjustment of the individual protection elements 5 by a user is necessary during installation of the device 1.

The protection elements 5 arranged parallel to one another prevent birds from entering the interspace between the object 12 and the roof surface 14.

Figure 3:
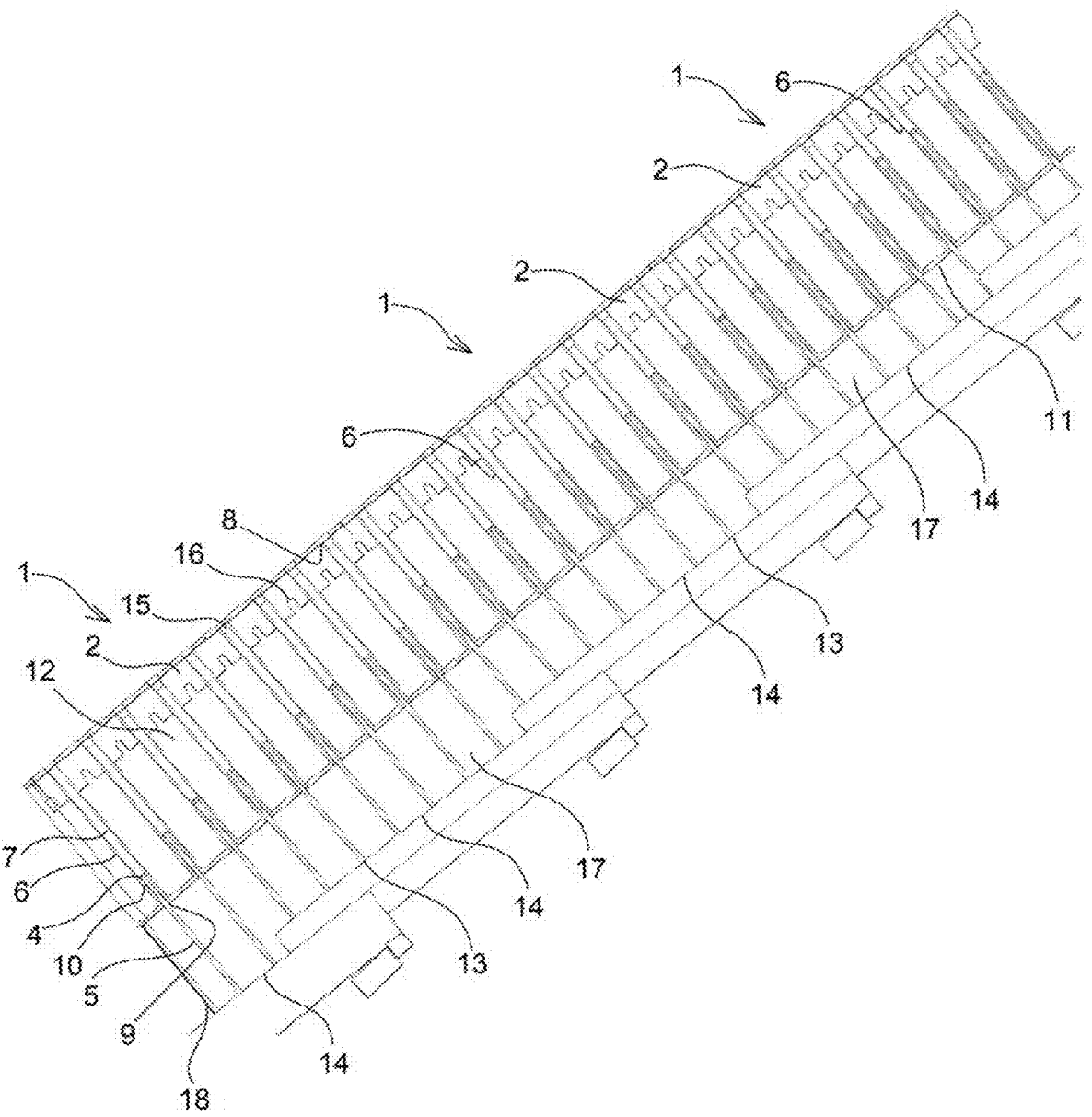
FIG. 3 shows a schematic view of a different arrangement according to at least some embodiments of the present invention.

FIG. 3 is a schematic view of a different arrangement according to at least some embodiments of the present invention. The roof surface 14 is formed from multiple roof tiles which overlap one another. An object 12 on the roof is attached at a distance from the roof surface 14 by means of posts 18, resulting in an interspace 17 between the roof surface 14 and the object 12. As shown in FIG. 1, fastening supports 2 for multiple devices 1 for protection against birds are attached to the object 12 such that the interspace 17 is, by way of protection elements 5, circumferentially obstructed by a contiguous array of devices 1. The object 12 can, e.g., comprise a solar module or a plurality of solar modules. As clearly shown in FIG. 3, the circumferentially arranged protection elements 5 each independently conform to the contour of the roof surface 14.

FIG. 3 likewise clearly shows that a free length of the protection elements 5 between the roof surface 14 and the exit openings 9 of the guide sleeves 6 is relatively short. Any bending or deformation of the protection elements 5 by a bird is thereby prevented, or at least hindered. Therefore, the device 1 according to the invention represents an insurmountable obstacle to a bird, so the interspace 17 (which is protected from the elements) between the object 12 and the roof surface 14 cannot be used as a place for birds to sleep or nest. A negative effect on the utility of the building can thereby be prevented.

If, upon installation of a continuous array of devices 1, the protection elements 5 protrude beyond the extent of the object 12, then the devices 1 can be made correspondingly smaller using the predetermined breaking points 16, i.e., unneeded protection elements 5 can easily be separated and removed.

It is understood that the embodiments of the present invention are not restricted to the specific structures or materials disclosed herein. Instead, their equivalents can also be included in a manner discernible by the average skilled person in the relevant field. It is understood that the terminology used herein is merely used to describe specific embodiments and should not be interpreted as being restrictive. The features, structures, or properties described can be combined into one or multiple embodiments in any suitable manner.

LIST OF REFERENCE SIGNS

1 Device
2 Fastening support
3 Holders
4 Head part
5 Protection element
6 Guide sleeve
7 Guide channel
8 Entry opening
9 Exit opening
10 Narrowing of the cross section
11 Stabilizing connection piece
12 Object
13 End of protection element
14 Roof surface
15 Plugs
16 Predetermined breaking point
17 Interspace
18 Posts

The invention claimed is:

1. A device for protecting against birds, which has at least one fastening support on which holders are provided, wherein the holders protrude from the at least one fastening support and through each of the holders a protection element is guidable, said protection element comprising a head part, wherein:

the holders are formed by guide sleeves, which are held on the at least one fastening support in parallel and at a distance from one another, wherein each of the guide sleeves comprises a guide channel having an entry opening and an exit opening, wherein each guide channel has a narrowing of the cross section of the guide channel between the entry opening and the exit opening, each of the protection elements is movable, in a free falling manner, in the associated guide sleeve from the entry opening thereof at most to the narrowing of the cross section thereof until the fall of the protection element is stopped by the guidable head part thereof resting against the narrowing of the cross section, and wherein adjacent ones of the guide sleeves, which are held in parallel with one another on the at least one fastening support, are further interconnected by at least one stabilizing connection piece that is spaced apart from the at least one fastening support.

2. The device according to claim 1, wherein the at least one stabilizing connection piece is located at a height of an end of the guide sleeves facing away from the at least one fastening support.

3. The device according to claim 1, wherein the at least one stabilizing connection piece is oriented parallel to the at least one fastening support.

4. The device according to claim 1, wherein a plurality of stabilizing connection pieces form a throughgoing stabilizing strip.

5. The device according to claim 1, wherein the protection elements are pin-shaped elements, each comprising the head part.

6. The device according to claim 5, wherein the pin-shaped elements are in made of metal or plastic.

7. The device according to claim 1, wherein the protection elements are wires, each comprising a wire head.

8. The device according to claim 7, wherein the wires are made of metal.

9. The device according to claim 1, wherein the guide sleeves are oriented perpendicular to the at least one fastening support.

10. The device according to claim 1, wherein the portions of the protection elements inserted into the guide sleeves and protruding from the respective exit openings of the guide sleeves form a stabilizing protection region preventing lateral elasticity.

11. The device according to claim 10, wherein the stabilizing protection region is oriented perpendicular to the at least one fastening support.

12. The device according to claim 10, wherein the length of the stabilizing protection region that prevents lateral elasticity is, in the direction of motion of the protection elements, determined by:

the lengthwise portion of the guide sleeves protruding over the at least one fastening support from the lower edge of the guide sleeve to the narrowing of the cross section of the respective guide channel in addition to:

the length of each protection element affixed to the narrowing of the cross section of the respective guide channel and protruding therefrom.

13. The device according to claim 1, wherein the entry openings of the guide sleeves is in each case closeable by a plug, or all of them closed by a plug strip, by means of which the securing elements inserted into the guide sleeves are in each case prevented from falling out of the insertion openings of the guide sleeves.

14. The device according to claim 1, wherein predetermined breaking points are provided between the guide sleeves, which are arranged on the at least one fastening support in parallel and at a distance from one another.

15. The device according to claim 14, wherein the predetermined breaking points are provided parallel to one another.

16. The device according to claim 1, wherein the guide sleeves are made of UV-stabilized plastic.

17. An arrangement comprising one object and at least one device for protection against birds according to claim 1.

18. The arrangement according to claim 17, wherein the object is a photovoltaic module or a solar module.

* * * * *